United States Patent [19]

Sawicki et al.

[11] Patent Number: 4,664,488
[45] Date of Patent: May 12, 1987

[54] LIGHT REFLECTING APPARATUS INCLUDING A MULTI-ABERRATION LIGHT REFLECTING SURFACE

[75] Inventors: Richard H. Sawicki, Pleasanton; William Sweatt, Livermore, both of Calif.

[73] Assignee: The United States of America as represented by the United States Department of Energy, Washington, D.C.

[21] Appl. No.: 800,632

[22] Filed: Nov. 21, 1985

[51] Int. Cl.$^4$ ............................ G02B 7/18; G02B 5/10
[52] U.S. Cl. .................................. 350/611; 350/607; 350/632
[58] Field of Search ............... 350/607, 608, 609, 611, 350/631

[56] References Cited

U.S. PATENT DOCUMENTS

| | | | |
|---|---|---|---|
| 3,603,671 | 9/1971 | Brown | 350/611 |
| 4,066,343 | 1/1978 | Scott | 350/611 |
| 4,226,507 | 10/1980 | Fuschetto | 350/611 |
| 4,533,219 | 8/1985 | Aldrich | 350/632 X |

Primary Examiner—Donald Watkins
Attorney, Agent, or Firm—Henry P. Sartorio; L. E. Carnahan; Judson R. Hightower

[57] ABSTRACT

A light reflecting apparatus including a multi-aberration bendable light reflecting surface is disclosed herein. This apparatus includes a structural assembly comprised of a rectangular plate which is resiliently bendable, to a limited extent, and which has a front side defining the multi-aberration light reflecting surface and an opposite back side, and a plurality of straight leg members rigidly connected with the back side of the plate and extending rearwardly therefrom. The apparatus also includes a number of different adjustment mechanisms, each of which is connected with specific ones of the leg members. These mechanisms are adjustably movable in different ways for applying corresponding forces to the leg members in order to bend the rectangular plate and light reflecting surface into different predetermined curvatures and which specifically include quadratic and cubic curvatures corresponding to different optical aberrations.

19 Claims, 11 Drawing Figures

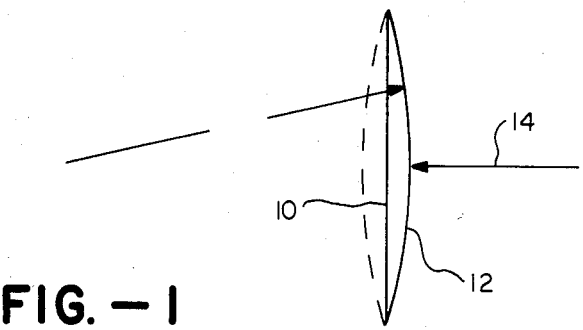
FIG.—1
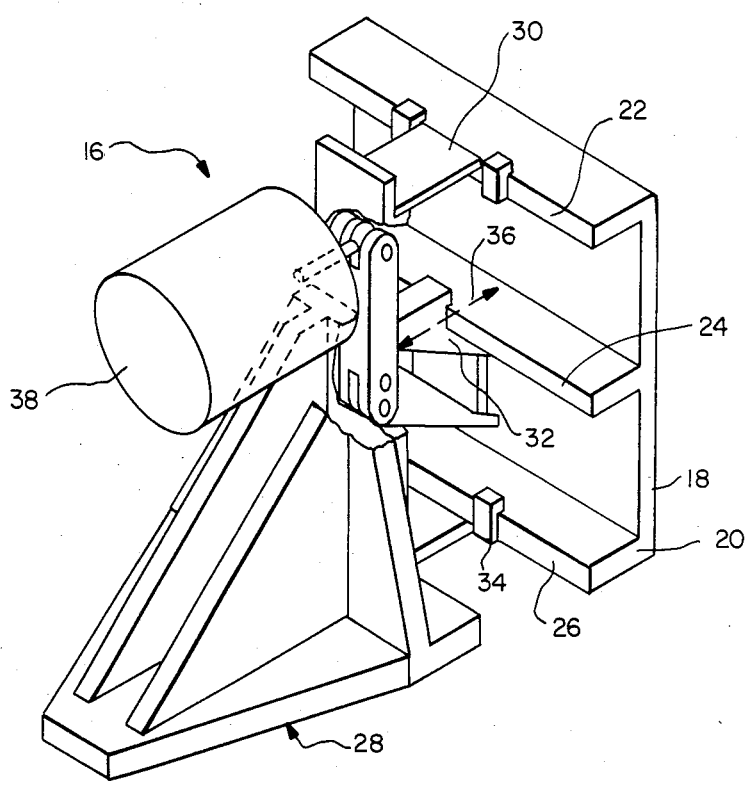
FIG.—2

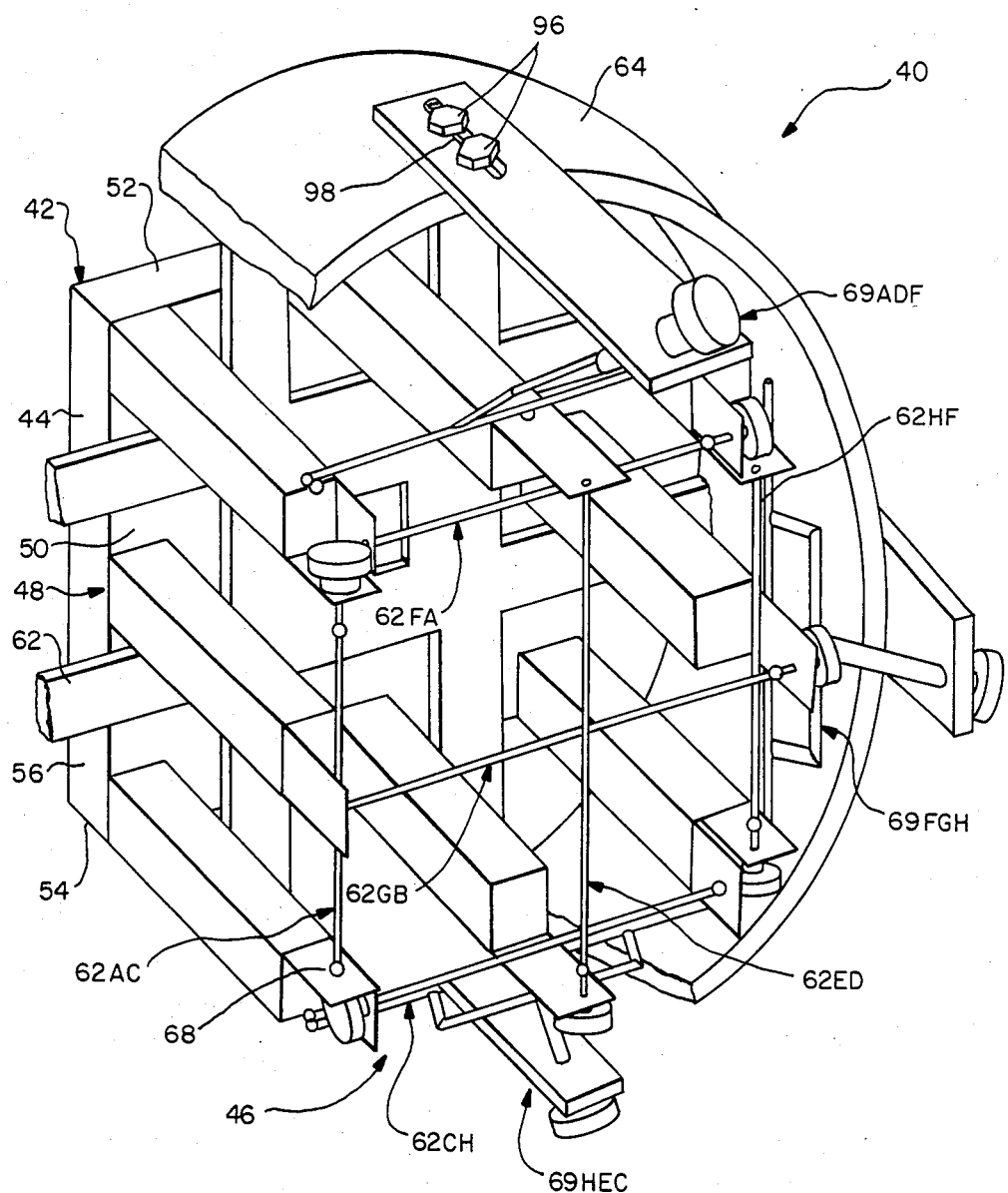
FIG.—3

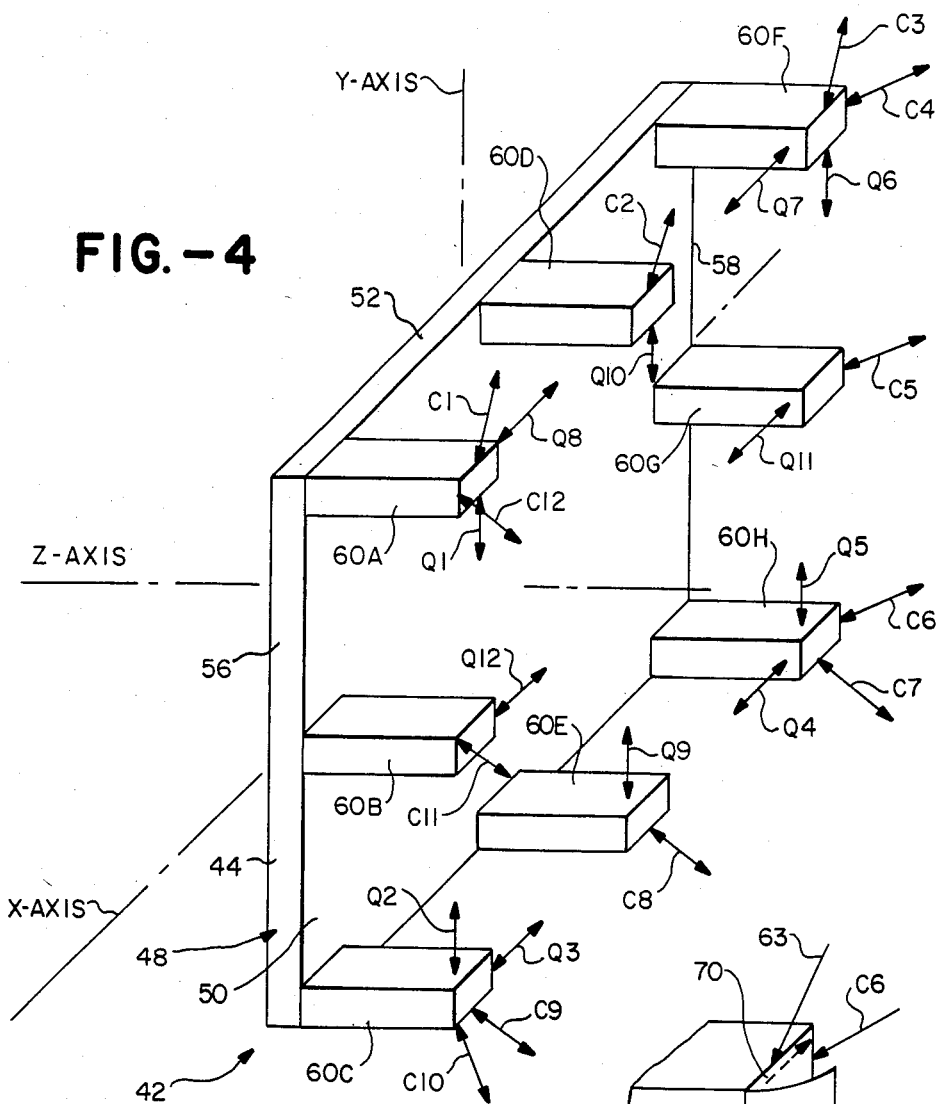
FIG.—4
FIG.—5
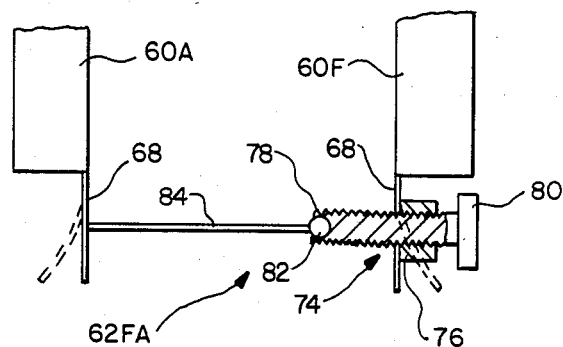
FIG.—6

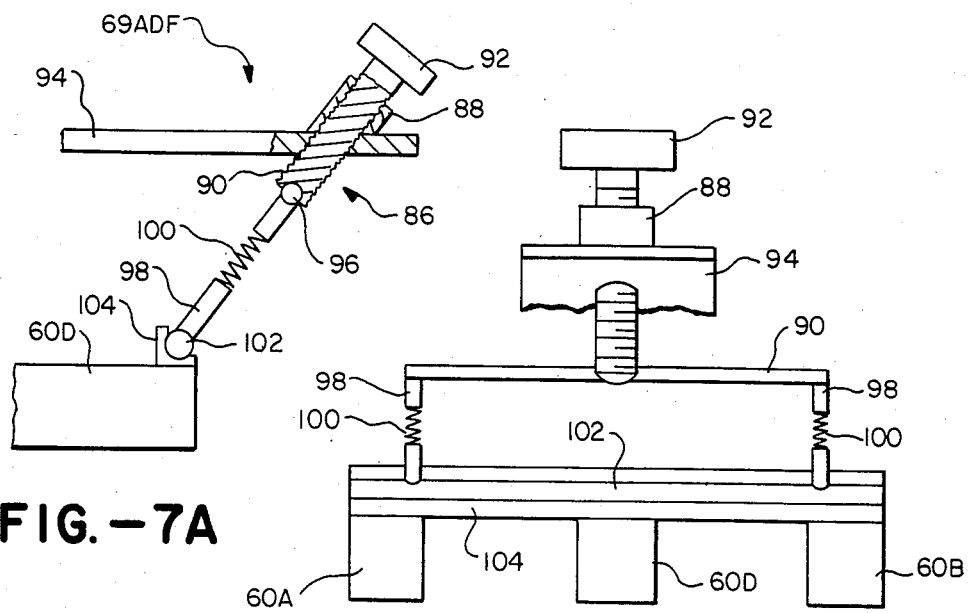
FIG.-7A
FIG.-7B
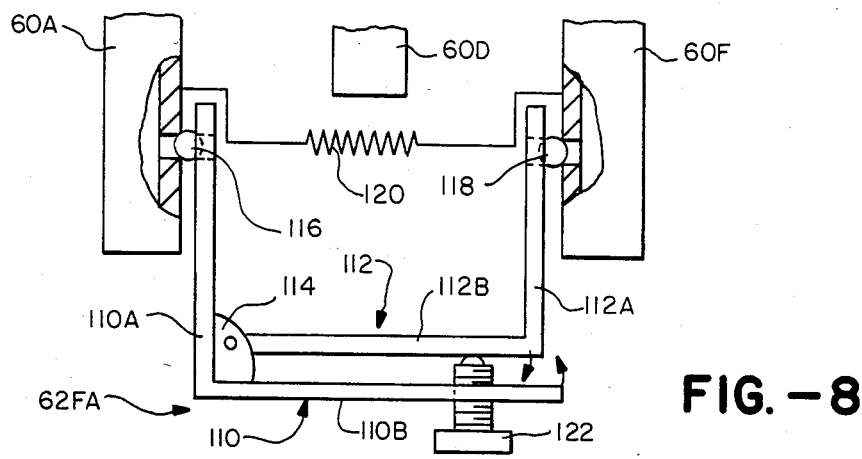
FIG.-8
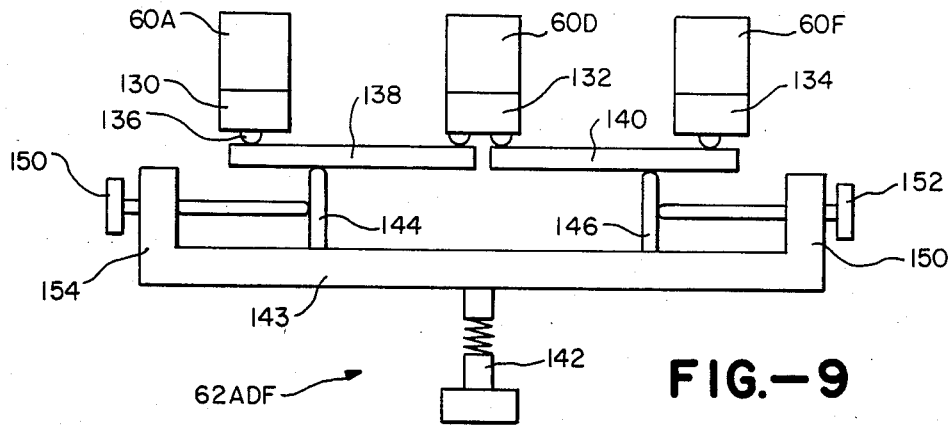
FIG.-9

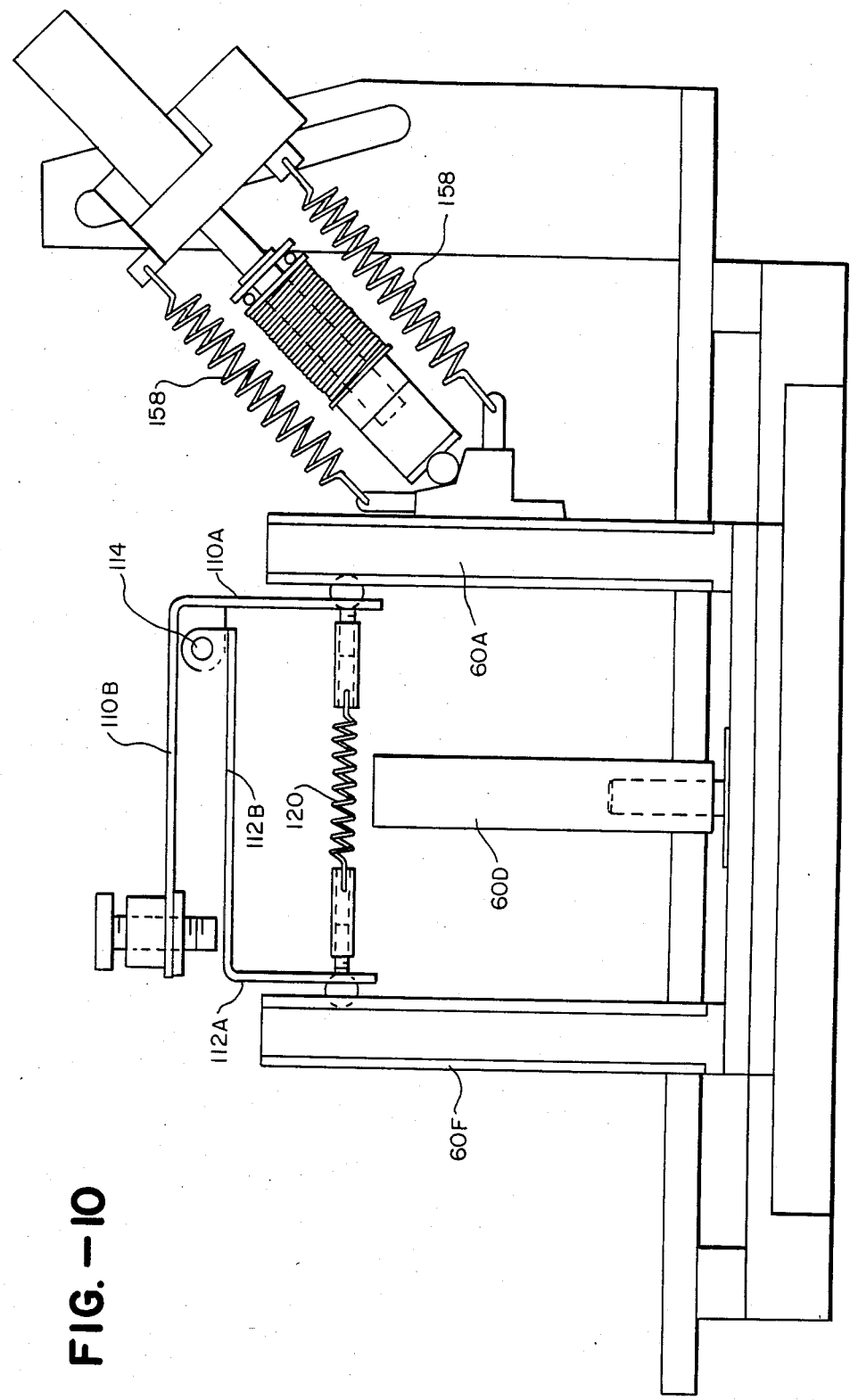
FIG.—10

4,664,488

LIGHT REFLECTING APPARATUS INCLUDING A MULTI-ABERRATION LIGHT REFLECTING SURFACE

The United States Government has rights in this invention pursuant to contract number W-7405-ENG-48 between the United States Department of Energy and the University of California for the operation of the Lawrence Livermore National Laboratory.

FIELD OF THE INVENTION

Background of the Invention

The present invention relates generally to techniques for bending planar surfaces and more particularly to a specific technique for bending a light reflecting surface into different predetermined curvatures including quadratic and cubic curvatures and combinations of quadratic and cubic curvatures.

It is not uncommon for astigmatism, one type of optical aberration, to develop in a light beam passing through an optical system. A known way to correct for this astigmatism is to reflect the beam off of a mirrored surface which has a slight convex or concave cylindrical configuration in the appropriate direction relative to the incident axis of the beam's astigmatism. The degree of curvature depends upon the amount of astigmatism in the beam. FIG. 1 illustrates means 10 defining a cylindrical light reflecting surface 12 having a radius of curvature r. The axis of the cylinder including surface 12 extends normal to the axis of the incident beam 14 (into the plane of the paper). The degree of curvature of surface 12, that is, the size of radius r, and whether the surface is convex relative to the incoming beam (as illustrated by solid lines) or concave (as shown by dotted lines), depends upon the amount of astigmatism in beams 14 which is to be corrected. It the beam displays no astigmatism at all, surface 12 would be entirely flat.

The discussion of FIG. 1 immediately above assumes that the astigmatism in beam 14 could be predetermined. As a result, means 10 defines a fixed surface 12. In some cases, it is not possible to predetermine the astigmatism to be corrected for and therefore it is not possible to provide the appropriately curved light reflecting surface ahead of time. In FIG. 2 there is illustrated an apparatus generally indicated by the reference numeral 16 for adjustably bending a light reflecting surface 18 into a particular cylindrical shape whose radius can be selected depending upon the astigmatism to be corrected. As seen in FIG. 2, the surface 18 is defined by a bendable plate like member 20 including rearwardly extending spaced apart ribs 22, 24 and 26. The apparatus also includes a mechanism 28 including gripping members 30, 32 and 34 for gripping ribs 22, 24 and 26, respectively, in order to support the overall plate like member in the position illustrated. The upper and lower gripping members 30 and 34 are fixed and therefore retain the ribs 22 and 26, and therefore the upper and lower edges of surface 18, in fixed positions. At the same time, gripping member 32 is movable back and forth, to a limited extent, in the direction of two way arrow 36, that is, normal to surface 18 and along a line through the center of the light reflecting surface. Means including the motor 38 or any other suitable drive mechanism is provided for moving the gripping member 32 in the manner just recited, in a controlled fashion, in order to bend surface 18 to a desired curvature depending upon the amount of astigmatism of the light beam being reflected off of surface 18.

The overall apparatus 16 just described is known in the art. While such an apparatus provides an in line technique for adjusting the curvature of a light reflecting surface for astigmatism, the push-pull approach utilized does not result in a purely cylindrical shape that is, in mathematical terms, proportionate to $x^2$ (for small curvatures) where X is measured perpendicular to the cylinder's axis in the plane of the reflected surface. Rather, the push-pull action at the center of the surface to be bent, as in the apparatus illustrated in FIG. 2, produces a sizable term, generally proportionate to $|X|^3$ which, of course, is not cylindrical at all. In addition the loading technique produces some random warping because the loading is not determinate when the deflections are small (<1 micron).

A second type of device for adjusting the curvature of a light reflecting surface is described in an article entitled "three-actuator deformable water-cooled mirror" by Anthony Fuschetto of the Perkin-Elmer Corporation published in OPTICAL ENGINEERING/March/April 1981/Vol. 20, No. 2. The device described there uses piezoelectric stacks connected to six distinct points along the edges of a circular mirror. Each of these stacks applies a force between an associated pair of these points, generally parallel to the mirrored surface, thereby applying a bending moment to the mirror for bending the latter.

The fuschetto approach just described is a more accurate way to obtain a cylindrical contour on a mirror for correcting for astigmatism that the approach illustrated in FIGS. 2 and 3. However, even the Fuschetto design does not provide for accurately uniformly contouring the mirrored surface along its entire extent. A primary reason for this is that the mirrored surface is arcuate (circular) and each piezoelectric stack concentrates its application of force to distinct points on the arcuate edge of the mirrored surface.

The first arrangement described above, that is, the one generally illustrated in FIG. 2, is primarily designed to bend a light reflecting surface into different curvatures which approximate cylinders. The second arrangement discussed above, that is, the one disclosed in the FUSCHETTO article, is designed not only to correct for astigmatism by bending its light reflecting surface into a cylindrical curvature but is also capable of providing a focus mode. However, neither of these arrangements is capable of providing in a controlled manner both second and third order aberrations and combinations thereof.

SUMMARY OF THE INVENTION

In view of the foregoing, it is an object of the present invention to provide a light reflecting apparatus which includes its own light reflecting surface and which is capable of bending the light reflecting surface into a number of different predetermined curvatures in an uncomplicated and reliable manner.

Another object of the present invention is to provide an apparatus of the last mentioned type which is designed to bend its light reflecting surface into different predetermined quadratic and cubic curvatures and combinations of quadratic and cubic curvatures including but not limited to astigmatism, coma and focus as well as other miscellaneous quadratic and cubic aberrations.

Still another object of the present invention is to provide an apparatus of the last mentioned type which bends its light reflecting surface by the application of certain forces which substantially isolate these forces from one another so that the application of any one will not substantially affect any others.

As will be seen hereinafter, the overall apparatus disclosed herein comprises first means including a generally flat light reflecting surface which is resiliently bendable, to a limited extent, and second means connected with the first means and adjustably movable in a plurality of different ways for causing the light reflecting surface to bend in different predetermined curvatures, depending upon the way in which the second means is adjustably moved. In a preferred embodiment, the first means is comprised of a rectangular plate which is itself resiliently bendable, to a limited extent, and a plurality of straight leg members rigidly connected with the back side of the plate and extending rearwardly therefrom. In this same preferred embodiment, the second means causes the light reflecting surface to bend into its different curvatures by acting on the leg members in a way which imparts different bending moments to the plate, depending upon the way in which the second means is adjustably moved. Still referring to this preferred embodiment, the first and second means are specifically designed so that the reflecting surface can be bent into different predetermined quadratic and cubic curvatures and combinations of quadratic and cubic curvatures including but not limited to curvatures which correct for astigmatism as well as coma and focus aberrations.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The arrangement just recited briefly will be described in more detail hereinafter in conjunction with the drawings wherein:

FIG. 1 is a cross sectional view of a means defining a fixed light reflecting surface which illustrates how the light reflecting surface corrects for an astigmatism in a light beam reflected off of the surface;

FIG. 2 is a perspective view of an apparatus of the prior art for correcting for astigmatism in a light beam using an adjustably bendable light reflecting surface;

FIG. 3 is a perspective view of a light reflecting apparatus designed in accordance with the present invention;

FIG. 4 is a perspective view of a part of the apparatus of FIG. 3 illustrating various specific forces being applied thereto;

FIG. 5 diagrammatically illustrates the inter-relationship between all of the forces acting on a leg member forming part of the overall apparatus;

FIG. 6 is a side elevational view of a quadratic adjustment mechanism forming part of the apparatus of FIG. 3;

FIGS. 7a and 7b are side elevational and plan views, respectively of a cubic adjustment mechanism forming part of the apparatus of FIG. 3;

FIG. 8 is a diagrammatic illustration, in side elevation of a quadratic adjustment mechanism designed in accordance with a second embodiment;

FIG. 9 is a diagrammatic illustration, in plan view of a cubic adjustment mechanism designed in accordance with a second embodiment; and FIG. 10 is a perspective view of a part of a light reflecting apparatus designed in accordance with an actual working embodiment and specifically utilizing adjustment mechanisms corresponding to those shown in FIGS. 8 and 9.

DETAILED DESCRIPTION OF THE INVENTION

Reference will now be made in detail to preferred embodiments of the invention, examples of which are illustrated in the accompanying drawings. While the invention will be described in connection with these preferred embodiments, it will be understood that it is not intended to limit the invention to those embodiments. On the contrary, it is intended to cover all alternatives, modifications and equivalents as may be included within the spirit and scope of the invention as defined by the appended claims.

Turning not to the drawings wherein like components are designated by like reference numerals throughout the various figures, attention is immediately directed to FIG. 3 which illustrates a light reflecting apparatus 40 designed in accordance with the present invention. This apparatus comprises a structural assembly 42 including a generally flat light reflecting surface 44 and an arrangement 46 of adjustment mechanisms interconnected with the structural assembly for bending the light reflecting surface into different predetermined curvatures including quadratic and cubic curvatures and combinations thereof. For purposes of this description, it will be assumed that light reflecting surface 44 lies within the x-y plane of an x, y, z coordinate system such that the origin of the system is at the center of the light reflecting surface and such that the x axis extends to a horizontal direction, the y axis extends to a vertical direction and the z axis extends normal to and through the center of the light reflecting surface, as illustrated in FIG. 4. In this frame of reference, overall apparatus 40 is designed so that arrangement 46 is able to bend light reflecting surface 44 into specific quadratic and cubic curvatures including but not limited to those defined by the following equations where A and B are constants and z is the deflection of the surface in the z direction:

$$Z = Ax^2 + By^2 \tag{1}$$

$$Z = Ax^3 + Bxy^2 \tag{2}$$

$$Z = Ay^3 + Bx^2y \tag{3}$$

$$Z = Ax^3 + By^3 \tag{4}$$

In the above equation 1, where either A or B is equal to zero and the other is not, the equation reduces to either $Z = Ax^2$ or $Z = By^2$ and therefore defines astigmatism. In the same equation, where A and B are equal (not zero), the equation and therefore the curvature of the light reflecting surface defines focus. Equations 2 and 3 define coma and equation 4 defines miscellaneous aberrations depending upon the values of A and B.

Note that in all of the equations 1-4 just discussed, the curvatures defined thereby include a quadratic component, a cubic component or both. As will be discussed below, arrangement 10 is particularly designed to provide both types of curvatures and thereby provide a light reflecting surface having multi-aberration capabilities.

Referring to FIG. 4 in conjunction with FIG. 3, structural assembly 42 is shown including a rectangular plate 48 which is resiliently bendable, to a limited extent, and which has a front side defining light reflecting surface 44, back side 50, top and bottom edges 52 and 54, respectively, and opposite side edges 56 and 58, respectively. The structural assembly also includes eight straight leg members 60a–60h which are integrally formed or otherwise rigidly connected with and extend rearwardly from the back side 50 of plate 48, as best illustrated in FIG. 4. It should be noted that all of the leg members are located at the edges of plate 48 and each is rectangular in cross section. The legs 60a, 60c, 60f and 60h are located at the corners of the plate while leg members 60 b, d, g and e are located centrally between the corner leg members.

As illustrated in FIG. 3, overall structural assembly 48 is supported by a mirror holder 62 or other suitable means within a support tube 64 or other suitable housing. In the particular embodiment illustrated in FIG. 3, plate 48 and all of the leg members are constructed of Invar although they could be constructed of other suitable materials so long as the structural assembly functions in the intended manner.

Returning to FIG. 4, different groups of force vectors are illustrated in association with the various leg members 60. These force vectors represent the forces which can be applied to the leg members by means of arrangement 46 in order to bend plate 48 and therefore light reflecting surface 44 in ways which produce the above recited quadratic and cubic curvatures. The arrows are directionally accurate with respect to their associated leg members and are two headed in order to represent both pushing and pulling motion. There are two distinct groups of forces, those which contribute quadratic components to the curvature of light reflecting surface 44 (hereinafter referred to as quadratic forces) and those which contribute cubic components (hereinafter referred to as cubic forces). The quadratic force vectors contributing to quadratic curvature are indicated by the letter Q while the cubic force vectors contributing to cubic curvature are indicated by the letter C, with the individual force vectors being designated by the reference numerals 1, 2, 3 and so on, as shown in FIG. 4. Thus referring for example to leg member 60a, quadratic forces Q8 and Q1 respectively parallel to top and side edges 52 and 56 of plate 48 act on that leg member in either a pushing or pulling manner. At the same time, leg 60a is acted upon by quadratic forces C1 and C12. The force C1 acts upon the leg member in a plane parallel to the y, z plane at an angle of 45° to the leg member while cubic force C12 acts on leg member 60a in a plane parallel to the x, z plane at the same 45° angle to the leg member. Each of the other corner leg members includes four similar forces while the intermediate leg members (e.g., those not at the corners) include a single quadratic component and a single cubic component, as illustrated.

As will be described in more detail hereinafter with respect to FIGS. 3 and 5–7, arrangement 46 includes two specific groups of adjustment mechanisms for adjustably providing the various quadratic and cubic force components just described. It will be seen that these different adjustment mechanisms are designed such that each adjustment mechanism is responsible for more than one quadratic or cubic force component. For example, one such mechanism is responsible for applying equal and opposite quadratic pulling or pushing forces to leg members 60a and 60c. As another example, a second mechanism is provided for simultaneously applying equal pushing or pulling cubic forces C1, C2 and C3 to leg members 60a, 60d and 60f, respectively. While the overall apparatus 40 includes a specific arrangement including these various mechanisms, it is to be understood that the present invention is not limited to such mechanisms but rather other suitable means may be utilized to provide the various force components illustrated.

Turning again to FIG. 3, arrangement 46 is shown including six quadratic adjustment mechanisms 62ac, 62ch, 62hf, 62fa, 62ed, and 62gb. While one of these mechanisms will be described in more detail hereinafter, for the moment it suffices to point out that each is elongated in configuration and has opposite ends connected with a specific pair of leg members 60 in order to adjustably apply quadratic forces to those members in the manner to be described. For example, the adjustment mechanism 62ac is connected with leg members 60a and 60c in order to provide quadratic forces Q1 and Q2; the adjustment mechanism 62ch is connected with leg members 60c and 60h in order to provide quadratic forces Q3 and Q4; and so on, as shown in FIG. 3.

Note that arrangement 46 includes flexures fixedly connected with the various leg members and serving as extensions for connecting the mechanisms 62 to their respective leg members. For purposes of convenience, these flexures are all generally indicated by the reference numeral 64. Note that the corner leg members include two such flexures while the intermediate leg members each have only one. Also note that each flexure is plate like in configuration and is welded or otherwise fixedly connected to its associated leg member. As will be discussed below, each of the adjustment mechanisms is connected to its associated pair of leg members by specific flexures 68 so as to simultaneously push the two leg members away from one another or pull them toward one another in order to provide the associated force components illustrated in FIG. 4.

Still referring to FIG. 3, arrangement 46 is also shown including three cubic adjustment mechanisms 69adf, 69fgh, and 69hec. While not shown, there is a fourth cubic adjustment mechanism which would be indicated at 69abc. While one of these mechanisms will be described in detail hereinafter, for the moment, it suffices to say that each applies simultaneous cubic forces to three associated leg members.

Turning to FIG. 5a, there is shown a diagrammatic illustration of exactly how a quadratic force is applied to its associated leg member by means of a connected flexure. The specific leg member illustrated in FIG. 5 is leg member 60f and the quadratic force applied to its flexure 68 is the quadratic force Q4. Note that the flexure bends away in response to the application of force a substantial amount before the force is actually translated to the leg member in order to cause the latter to bend. In this way, the relatively large adjustment to the adjustment mechanism associated with that force, specifically mechanism 62ch illustrated in FIG. 3, is required in order to provide a relatively small change in movement of the leg member and therefore a relatively small change in the curvature of the mirrored surface as a result of the adjustment. This arrangement serves two purposes. First it provides for greater adjustment sensitivity as just described and, second, it allows the quadratic force Q4 being applied to leg member 60f to be substantially isolated from the counter cubic force which is applied to the leg member, specifically the cubic force C6 in the case of leg member 60f. With the particular configuration illustrated, the application of the cubic force C6 will not in any significant way change the magnitude or direction of quadratic force Q4, and, as will be seen hereinafter, the application of cubic force Q4 will not to any significant degree change the direction or amplitude of cubic force C6.

Another form of isolation is provided between the quadratic forces and those cubic forces which are applied perpendicular to the quadratic forces. In FIG. 5, this is illustrated by the quadratic force Q4 and cubic force C3. In this case, the concern is not that the quadratic force will effect the magnitude of the cubic force or vise versa but rather that one will change the direction of the other with respect to the leg member as the latter is caused to bend. For example, the quadratic force Q4 applied to flexure 68 in the manner shown in FIG. 5a will cause the leg member to bend in the direction indicated by dotted arrow 70. As will be seen below, the adjustment mechanism associated with cubic force C3, specifically the adjustment mechanism 69adf, is connected with leg member 60f in a way which allows the leg member to move in the direction of arrow 70 without effecting the direction of force C3 on the leg member. At the same time, it should be noted that the cubic force C3 provides a small degree of movement of the leg member in the direction of arrow 72. The flexure 68 prevents this movement from effecting in any significant way the direction at which the cubic force Q4 is applied to the leg member.

In summarizing the discussion immediately above in conjunction with FIG. 5, it can be said that the application of quadratic forces to a given leg member do not substantially effect the magnitude or direction of those cubic forces applied to the same leg member and vise versa. Thus, with regard to the entire structural assembly 42, it can be said that the various quadratic forces applied to the leg members do not in any substantial way effect the magnitude and direction of the cubic forces applied to these leg members and vise versa. Moreover, for the same reasons, the application of a particular quadratic force does not substantially effect the amplitude or direction of another quadratic force on the same leg member (in the case of corner leg members), and this is also true for quadratic forces applied to the same corner leg member.

Referring now to FIG. 6, attention is directed to one embodiment of a quadratic adjustment mechanism 62fa. As indicated above, this mechanism is provided for simultaneously applying equal pulling or pushing quadratic forces Q8 and Q7 to leg members 60a and 60f, respectively through associated flexures 68. To this end, the adjustment mechanism includes a micrometer 74 which is comprised of an internally threaded sleeve 76 fixedly connected to the back side of the flexure 68 connected to leg member 60f; an externally threaded shaft 78 thread connected into the sleeve 76 and extending through a cooperating opening in the flexure; and a knob 80 forming one end of the threaded shaft on the rearward side of sleeve 76. The overall adjustment mechanism also includes a bearing 82 rotatably mounted within a cooperating bearing socket formed at the otherwise free end of shaft 78. A connecting rod 84 is fixedly connected at one end to bearing 82 and is fixedly connected at its other end to the flexure 68 associated with leg member 60a. It is to be understood that the other quadratic adjustment mechanisms 62ac, 62ch and so on may be identical to mechanism 62fa.

Having described adjustment mechanism 62fa from a structural standpoint, attention is now directed to the way in which it operates to provide quadratic forces Q7 and Q8. Still referring to FIG. 6, note that the shaft 78 of micrometer 74 can be moved in and out of its sleeve 76 by means of knob 80. This, inturn, causes the flexures to move away from one another as indicated by the dotted lines or towards one another. This, therefore, results in the application of simultaneously forces Q7 and Q8 pushing away from or pulling towards one another, depending upon the direction in which shaft 78 is moved. It should be apparent that the movement of the flexures and the leg members themselves cause the one flexure and associated leg member to be skewed with respect to the other. The bearing connection 82 compensates for this skewing action so as to maintain the quadratic forces in compression or tension with respect to their leg members. It also aids in providing the previously discussed isolation between the various quadratic and cubic forces.

Turning not to FIGS. 7a and 7b in conjunction with FIG. 3, attention is directed to the structural details of one of the cubic adjustment mechanisms, specifically adjustment mechanism 69adf in accordance with one embodiment of the present invention. As seen there (and in FIG. 3) the adjustment mechanism includes its own micrometer 86 including an internally threaded sleeve 88; an externally threaded shaft 90 thread connected within the sleeve; and a knob 92 forming one end of the threaded shaft. The threaded shaft is located outwardly from and directly over leg member 60a at a 45° angle to the latter by means of a support plate 94. This support plate is adjustably connected to support tube 64 by means of adjustment bolts 96 and a cooperating slot 98 (see FIG. 3) so that the angular position of shaft 90 of micrometer 86 can be adjusted with respect to the leg member 60d. The sleeve 88 is fixedly connected to the top side of the support plate 94 and shaft 90 extends through a cooperating opening in the latter. The overall adjustment mechanism 69adf also includes an intermediate cross arm 96 centrally disposed within a cooperating socket 97 in the otherwise free end of shaft 90. A pair of parallel connecting links 98 which are centrally spring loaded at 100 are connected to cross arms 96 and to a second longer cross arm 102. The cross arm 102 sits within elongated V-grooves of connectors fixed to associated leg members 60a, 60d, and 60f so that the one adjustment mechanism is able to apply cubic forces C1, C2 and C3 simultaneously. The leg members are prestressed away from the adjustment mechanism so that the latter work in one direction only, that is against the prestress forces. In that way, there is always forces which maintain cross arm 102 in its v-groove. The other cubic adjustment mechanisms may be identical to mechanism 69adf.

Having described a particular embodiment for each of the adjustment mechanisms 62fa and 69adf, attention is now directed to FIGS. 8, 9 and 10 for a discussion of adjustment mechanisms 62fa' and 69adf' designed in accordance with second embodiments of the present invention.

Turning first to the adjustment mechanism 62fa', it should be noted at the outset that the leg members are hollow and that the corner leg members are slightly longer than the intermediate leg members. Referring specifically to adjustment mechanism 62fa', this mechanism is shown including two L-shaped flexures 110 and 112 respectively including opposing legs 110a, 110b and 112a, 112b. The free end of leg 112b is pivotally connected to the joining point of legs 110a, 110b by means of a suitable pivot connecting member 114. The legs 110a and 112a are positioned against the confronting sides of leg member 60a and 60f through cooperating ball bearings 116 and 118, respectively. As seen in FIG. 8, these ball bearings are held in their respective positions by cooperating openings in the leg members 60a and 60f and the legs 110a and 112a. Both of the leg members 60a and 60f are spring biased towards one another by means of a load spring diagrammatically illustrated at 120 (for purposes of clarity). Note that the load spring is connected by suitable means generally indicated at 121 to leg members 100a and 60f so that the spring actions is in line with ball bearings 116 and 118. Thus, the legs 60a and 60f want to move toward one another. However, at the same time, the overall adjustment mechanism includes a micrometer 122 which is suitably connected with the two leg members 110b and 112b in the manner shown so as to adjustably maintain the flexures in different positions which will prevent the legs 60a and 60f from moving further towards one another. Thus, by adjusting the micrometer in one direction, the leg 110 and 112 are caused to move away from one another and by adjusting the micrometer in the opposite direction the legs 110a and 112a are caused to move towards one another thereby varying the cubic forces Q7 and Q8 in the desired way.

Turning now to FIG. 9, attention is directed to the structural details of cubic adjustment mechanism 69adf. Note that each of the associated leg members 60a, 60d and 60f include connecting tracks 130, 132 and 134 for containing laterally movable bearings 136. In the case of track 132, two such bearings are provided for the reasons to become apparent. These tracks and bearings form part of the overall mechanism which also includes two connecting bars 138 and 140 respectively positioned in the manner shown. Mechanism 69adf further includes a spring loaded micrometer 142 for moving an elongated member 143 towards and away from the leg members. A pair of connecting links 144 and 146 interconnect member 143 with connecting bars 138 and 140. Note that the connecting links 144 and 146 are located substantially closer to the leg members 60a and 60f than to the leg member 60d. Specifically the link 144 is located one-third of the distance from leg member 60a as compared to leg member 60d and the link 146 is located one-third of the distance from leg member 60f as compared to leg member 60d. In this way, as the micrometer 142 is moved in and out, equal forces are applied to all three leg members by the two connecting links 144 and 146. These links ride in cooperating tracks in member 143 (not shown) and are adjustably movable within these tracks by means of adjustment knobs 150 and 152 which are thread connected through cooperating flanges 154 and 156 at the end of member 142. Note that in order for overall mechanism 69adf to operate in this manner, the leg member 60a, 60d, and 60f must be spring biased in the direction away from micrometer 142. This is accomplished by means of a pair of spring mechanisms 158 forming part of the mechanism 69adf as shown in FIG. 10.

Both of the adjustment mechanisms 62fa' and 69adf where illustrated some what diagrammatically in FIGS. 8 and 9. FIG. 10 illustrates an actual working embodiment of these two components. In this actual working embodiment, the members 122 and 142 are micrometers manufactured by Starret Corp.

The foregoing description of the preferred embodiments of the invention have been presented for purposes of illustration and description. It is not intended to be exhaustive or to limit the invention to the precise form discloses and obviously many modifications and variations are possible in light of the above teaching. The embodiments where shown and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. A light reflecting apparatus, comprising:
    (a) first means including a generally flat light reflecting surface which is resiliently bendable, to a limited extent; and
    (b) second means connected with said first means and adjustably movable in a plurality of different ways for causing said light reflecting surface to bend into different predetermined quadratic and cubic curvatures, depending upon the way in which the second means is adjustably moved, where quadratic and cubic curvatures are curvatures defined by quadratic and cubic mathematical equations.

2. An apparatus according to claim 1 wherein said light reflecting surface is adjustably bendable about orthogonal x and y axes and wherein said different predetermined curvatures include curvatures defined by equations containing $x^2$, $y^2$, $xy^2$, $yx^2$, $x^3$, $y^3$ and all possible combinations thereof.

3. An apparatus according to claim 1 wherein said first means include a rectangular plate which is resiliently bendable, to a limited extent, and which has a front side defining said light reflecting surface and a backside, said first means also including a plurality of straight leg members rigidly connected with the backside of said plate and extending rearwardly therefrom, and wherein said second means causes said light reflecting surface to bend into said different curvatures by acting on said leg members in a way which imparts different bending movements to said plate, depending on the way in which said second means is adjustably moved.

4. An apparatus according to claim 3 wherein said second means includes a first group of adjustment mechanisms, each of which is connected with specific ones of said leg members for causing said light reflecting surface to bend into said different quadratic curvatures and a second group of adjustment mechanisms, each of which is connected with specific ones of said leg members for causing said surface to bend into said different cubic curvatures.

5. An apparatus according to claim 4 wherein each of said first mechanisms includes a first type of micrometer and means for connecting said micrometer to its specific leg members and wherein each of said second mechanisms includes a second type of micrometer and means for connecting said last-mentioned micrometer to its specific leg members.

6. An apparatus according to claim 5 wherein said plate and light reflecting surface are bendable about an x-axis which is parallel to top and bottom edges of said plate and a y-axis which is perpendicular to said x-axis and parallel with opposite side edges of said plate, and wherein said plurality of leg members include first, second, third and fourth leg members located at the corners of said plate, a fifth leg member located between and equidistant from said first and second leg members, a sixth leg member located between and equidistant from said second and third leg members, a seventh leg member located between and equidistant from said third and fourth leg members, and an eighth leg member located between and equidistant from said fourth and fist leg members, all of said fifth through eighth leg members being located at an edge of said plate.

7. An apparatus according to claim 6 wherein said first group of adjustment mechanisms includes six such mechanisms numbers 1-6 connected with specific ones of said leg members in the following ways:

| First Adjustment Mechanisms | Leg Members |
| --- | --- |
| #1 | first and fourth |
| #2 | fourth and third |
| #3 | third and second |
| #4 | second and first |
| #5 | seventh and fifth |
| #6 | sixth and eighth |

8. An apparatus according to claim 7 wherein said second group of adjustment mechanisms includes four such mechanisms #1-4 connected with specific ones of said leg members in the following ways:

| Second Adjustment Mechanisms | Leg Members |
| --- | --- |
| #1 | first, fifth, second |
| #2 | second, sixth, third |
| #3 | third, seventh, fourth |
| #4 | fourth, eighth, first |

9. An apparatus according to claim 5 wherein said light reflecting surface is adjustably bendable about orthogonal x and y axes and wherein said different predetermined curvatures include curvatures defined by equations containing $x^2$, $y^2$, $xy^2$, $yx^2$, $x^3$, $y^3$ and all possible combinations thereof.

10. A light reflecting apparatus, comprising:
 (a) a structural assembly including
  (i) a rectangular plate which is resiliently bendable, to a limited extent, and which has a front side defining a light reflecting surface and an opposite backside, and
  (ii) a plurality of straight leg members rigidly connected with the backside of said plate and extending rearwardly therefrom; and
 (b) a plurality of different adjustment mechanisms, each of which is connected with specific ones of said leg members, said mechanisms being adjustably movable in different ways for applying corresponding forces to said leg members in order to bend said rectangular plate and said light reflecting surface into different predetermined curvatures.

11. An apparatus according to claim 10 wherein said light reflecting surface is adjustably bendable about orthogonal x and y axes and wherein said different predetermined curvatures include curvatures defined by equations containing $x^2$, $y^2$, $xy^2$, $yx^2$, $x^3$, $y^3$ and all possible combinations thereof.

12. An apparatus according to claim 10 wherein said adjustment mechanisms include a first group of adjustment mechanisms, each of which is connected with specific ones of said leg members for causing said light reflecting surface to bend into different quadratic curvatures and a second group of adjustment mechanisms, each of which is connected with specific ones of said leg members for causing said surface to bend into different cubic curvatures.

13. An apparatus according to claim 12 wherein each of said first mechanisms includes a first type of micrometer and means for connecting said micrometer to its specific leg members and wherein each of said second mechanisms includes a second type of micrometer and means for connecting said last-mentioned micrometer to its specific leg members.

14. An apparatus according to claim 10 wherein one group of said adjustment mechanisms apply corresponding forces to said leg members such that corresponding forces are generally parallel with said light reflecting surface.

15. An apparatus according to claim 14 wherein a second group of said adjustment mechanisms apply corresponding forces to said leg means such that the last-mentioned corresponding forces are at an acute angle with said light reflecting surface.

16. An apparatus according to claim 15 wherein said adjustment mechanisms include means associated with each individual mechanism such that the force applied by any mechanism of one of the groups is not substantially affected by the forces applied by mechanisms of the other group.

17. A light reflecting apparatus, comprising:
 (a) a structural assembly including
  (i) a plate member which is resiliently bendable, to a limited extent, and which has a front side defining a light reflecting surface and an opposite backside, and
  (ii) a plurality of straight leg members rigidly connected with the backside of said plate and extending rearwardly therefrom; and
 (b) first and second groups of adjustment mechanisms, each mechanism being connected with specific ones of said leg members, adjustably movable in different ways for applying corresponding forces to the connector leg members in order to bend said plate and said light reflecting surface, said mechanisms being configures such that the force applied by any mechanism or one of said groups is not significantly affected applied by the forces by mechanisms of the other group.

18. A light reflecting apparatus, comprising:
 (a) first means including a generally flat light reflecting surface which is resiliently bendable, to a limited extent; and
 (b) second means connected with said first means and adjustably movable in a plurality of different ways for causing said light reflecting surface to bend into different predetermined quadratic and cubic curvatures and combination of quadratic and cubic curvatures, depending upon the way in which the second means is adjustably moved, where quadratic and cubic curvatures are curvatures defined by quadratic and cubic mathematical equations, said second means including a first group of adjustment mechanisms, each of which is connected with specific ones of said leg members for applying forces to the connected leg members to cause said light reflecting surface to bend into said different quadratic curvatures and a second group of adjustment mechanisms, each of which is connected with specific ones of said leg members for applying forces to the connected leg members to cause said surface to bend into said different cubic curvatures.

19. An apparatus according to claim 19 wherein said adjustment mechanisms are configures such that the forces applied by any mechanism of one of said groups is not substantially affected by the forces applied by the mechanisms of the other group.

* * * * *